(12) United States Patent
McQuillen et al.

(10) Patent No.: US 11,507,113 B2
(45) Date of Patent: Nov. 22, 2022

(54) AERIAL VEHICLE SENSOR CALIBRATION SYSTEMS AND METHODS

(71) Applicant: Ford Global Technologies, LLC, Dearborn, MI (US)

(72) Inventors: Michael McQuillen, Warren, MI (US); Daniel Makled, Dearborn, MI (US); David Michael Herman, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 409 days.

(21) Appl. No.: 16/750,696

(22) Filed: Jan. 23, 2020

(65) Prior Publication Data

US 2021/0232158 A1 Jul. 29, 2021

(51) Int. Cl.
| | |
|---|---|
| *G05D 1/00* | (2006.01) |
| *B64C 39/02* | (2006.01) |
| *G05D 1/08* | (2006.01) |
| *G05D 1/10* | (2006.01) |
| *G08G 5/00* | (2006.01) |

(52) U.S. Cl.
CPC ........... *G05D 1/085* (2013.01); *B64C 39/024* (2013.01); *G05D 1/101* (2013.01); *G08G 5/0069* (2013.01); *B64C 2201/027* (2013.01); *B64C 2201/146* (2013.01); *B64C 2201/208* (2013.01)

(58) Field of Classification Search
CPC ........ G05D 1/085; G05D 1/101; G05D 1/102; G05D 1/00; B64C 39/024; B64C 2201/027; B64C 2201/146; B64C 2201/208; B64C 39/02; G08G 5/0069; G08G 5/0013; G08G 5/00; B64F 5/60; G01C 25/005; G01C 25/00
See application file for complete search history.

(56) References Cited

U.S. PATENT DOCUMENTS

| | | | |
|---|---|---|---|
| 9,056,676 B1 * | 6/2015 | Wang | B60R 9/00 |
| 9,302,783 B2 | 4/2016 | Mingyu | |
| 9,704,409 B2 | 7/2017 | Prakash et al. | |
| 9,944,404 B1 * | 4/2018 | Gentry | G07C 5/0816 |
| 10,400,840 B2 * | 9/2019 | Davis | B64F 5/60 |
| 11,048,277 B1 * | 6/2021 | Zhu | G06T 7/20 |
| 2016/0069681 A1 * | 3/2016 | Johnson | G01C 21/165 |
| | | | 33/356 |
| 2016/0271796 A1 * | 9/2016 | Babu | B25J 11/0075 |

(Continued)

FOREIGN PATENT DOCUMENTS

JP   2019053765 A   4/2019

OTHER PUBLICATIONS

Drone Calibration: The Complete Guide—Drone Pro Skills, Denim Kh., Nov. 26, 2018 (14 pages).

*Primary Examiner* — Yonel Beaulieu
(74) *Attorney, Agent, or Firm* — Brandon Hicks; Eversheds Sutherland (US) LLP

(57) ABSTRACT

Aerial vehicle sensor calibration systems and methods are provided herein. An example method includes determining a jarring event, determining when a drone is level relative to an aerial vehicle platform of a vehicle, the vehicle having a calibration controller, determining when the vehicle is level relative to a subordinate surface, and transmitting a signal to a drone controller by the calibration controller to calibrate a gyroscope or an accelerometer of the drone.

20 Claims, 3 Drawing Sheets

(56) References Cited

U.S. PATENT DOCUMENTS

| | | | | |
|---|---|---|---|---|
| 2016/0363659 | A1* | 12/2016 | Mindell | G01S 5/14 |
| 2018/0232907 | A1* | 8/2018 | Sung | H04N 17/002 |
| 2019/0323839 | A1* | 10/2019 | Gurdan | B64C 39/024 |
| 2020/0073385 | A1* | 3/2020 | Jobanputra | G06N 20/00 |
| 2020/0244890 | A1* | 7/2020 | Peters | H04N 5/23299 |
| 2020/0309929 | A1* | 10/2020 | Johnson | G01S 15/582 |
| 2021/0080260 | A1* | 3/2021 | Tremblay | G01C 21/30 |
| 2021/0109546 | A1* | 4/2021 | Christiana | B64C 39/024 |
| 2021/0309388 | A1* | 10/2021 | Ratajczak | B64C 1/30 |

* cited by examiner

AERIAL VEHICLE SENSOR CALIBRATION SYSTEMS AND METHODS

FIELD

The present disclosure is generally directed to systems and methods for aerial vehicle sensor calibration such as gyroscopes and accelerometers.

BACKGROUND

Aerial vehicles, such as drones, can be transported in vehicles. The drone can be rapidly deployed for use from an in-vehicle platform. These drones may rely upon their onboard gyroscope and accelerometer sensors for stable flight. Drone components may become unstable and require recalibration before use, especially after a jarring event that might occur relative to a vehicle. Examples of jarring events can include, but are not limited to, crashes, collisions, hard impacts, and the like. In some instances, if the drone is riding on/in a vehicle and the vehicle goes over a pothole, curb, speed bump, etc., one or more of these jarring events can destabilize the sensors of the drone. In such instances, operating the drone can be problematic to bystanders and/or drone operators. Also, without calibration, the drone may crash.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes systems and methods for calibrating one or more components of a drone using a vehicle-based platform integration. The drone can include an autonomous drone or a pilot-operated drone. A component of a drone, such as a gyroscope and/or accelerometer can be automatically triggered to recalibrate after the detection of a jarring event by a vehicle-based controller (could be located in the drone in some instances). In other instances, the drone component could be recalibrated after a certain number of flight cycles or even prior to each flight cycle if the systems and methods determine that the vehicle is operating on an uneven surface.

Generally, the systems and methods can determine if the drone and/or vehicle are currently positioned on a level surface. When the drone is determined to be on a level surface, the controller can execute a calibration process/routine for the component(s). In instances where the drone is determined not to be currently positioned on a level surface, the drone can be repositioned in a level configuration. An autonomous drone could self-adjust based on a calculated offset to position itself on a level surface. In some instances, it can be determined if the drone is level relative to the vehicle. It can also be determined if the vehicle itself is level to a subordinate surface, such as the ground. In some instances, the vehicle can be repositioned to a level surface. When the vehicle cannot be repositioned to a level surface, an offset can be calculated and applied as an input to a calibration routine.

Cameras can be used to determine if the drone is currently positioned on a level surface. Additionally, vehicle and/or drone accelerometers and gyroscope measurements can be used to determine relative orientations or offsets as noted above.

Advantageously, the systems and methods disclosed herein allow a drone's gyroscope and accelerometer sensors to be automatically calibrated based on a variety of vehicle and/or drone level conditions. This recalibration ensures accurate and stable drone flight over the lifetime of the drone without the need for constant human intervention. This calibration may be performed automatically assisting with autonomous vehicles used as launch/delivery platforms for a range of applications (e.g. last-mile delivery).

Illustrative Embodiments

Figure 1:
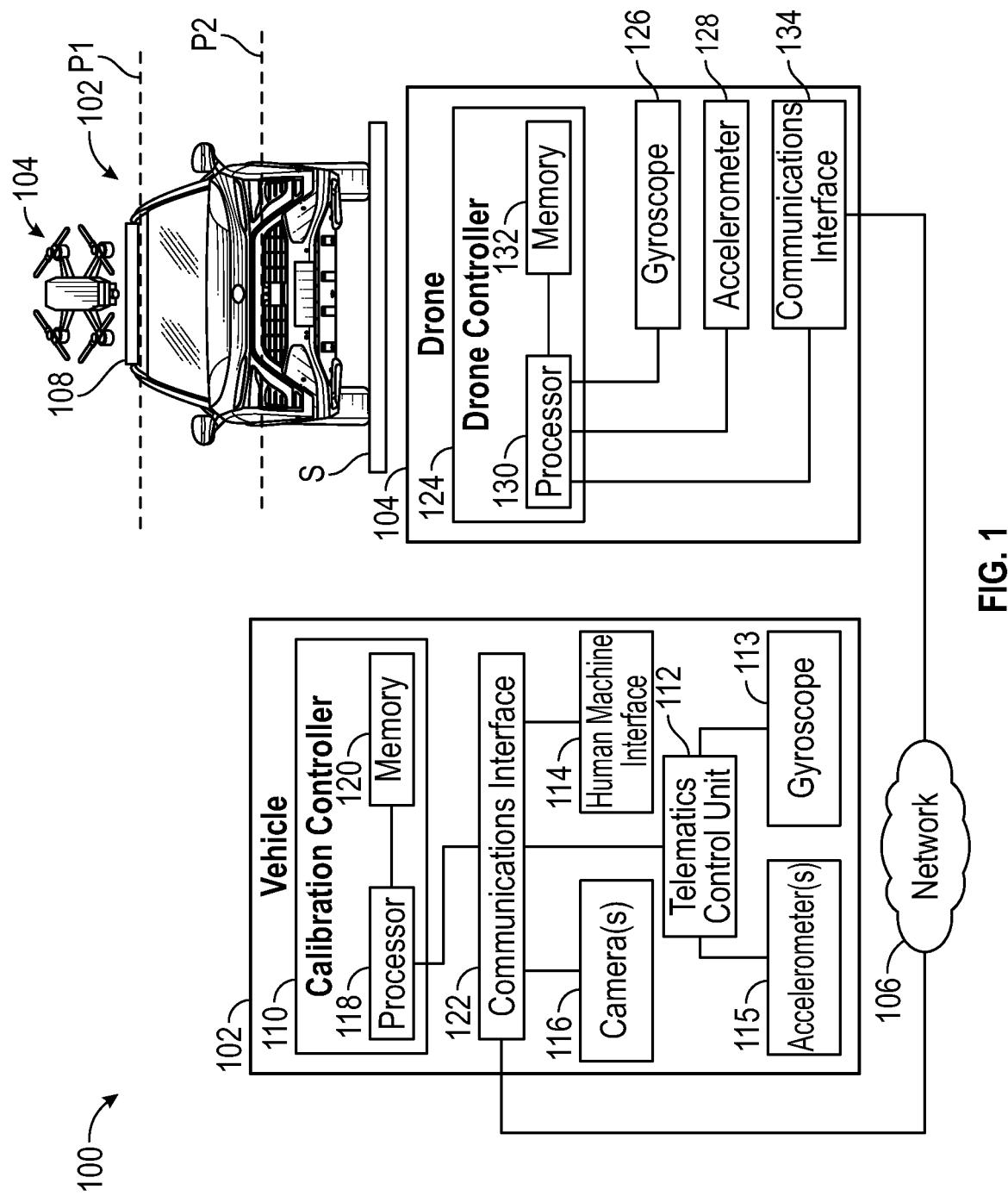
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. A vehicle 102 can be configured to transport a drone 104. The vehicle 102 and drone 104 can be communicatively coupled with one another over a network 106. This network 106 can comprise any one or a combination of short-range or long-range wireless communications such as Bluetooth, Bluetooth Low Energy, Near-Field Communications, Visual light communication, Wi-Fi, cellular, dedicated short-range communications (DSRC), radio frequency (RF), ZigBee, Z-Wave, and the like, or any suitable vehicle-to-drone communications protocol(s).

The vehicle 102 can comprise an aerial vehicle (AV) platform 108, a calibration controller 110, a telematics control unit 112, a human-machine interface 114, and one or more cameras 116. The AV platform 108 can include a specifically dedicated surface or compartment for drone landing and/or launching. The AV platform 108 could have a retractable cover in some instances that encloses a compartment that houses the drone 104. Alternatively, the AV platform 108 could include another flat surface of the vehicle 102 such as a bed of a truck or a roof of the vehicle 102.

The calibration controller 110 can comprise a processor 118 and memory 120. The memory 120 stores instructions that are executed by the processor 118 to perform aspects of jarring event detection, drone and/or vehicle orientation analysis, and/or drone recalibration as disclosed throughout. When referring to operations executed by the calibration controller 110 it will be understood that this includes the execution of instructions by the processor 118. The calibration controller 110 can communicatively couple to network 106 using a communications interface 122.

The drone 104 can comprise a drone controller 124, a gyroscope 126, and an accelerometer 128. The drone controller 124 can comprise a processor 130 and memory 132.

The memory 132 stores instructions that are executed by the processor 130 to perform aspects of drone calibration and drone operation as disclosed throughout. When referring to operations executed by the drone controller 124 it will be understood that this includes the execution of instructions by the processor 130. The drone controller 124 can communicatively couple to network 106 using a communications interface 134.

As noted above, the calibration controller 110 can determine if a jarring event has occurred. The determination of a jarring event could be based on any pre-determined threshold. For example, a threshold exceeding change above a g-force threshold of 1.3 could be used as a pre-determined threshold. Any desired g-force threshold value can be used. A sudden change in orientation or acceleration could also indicate a jarring event. For example, a change in the angle of the vehicle in over a fraction of a second, with a subsequent re-correction of the angle could indicate that a large bump was encountered by the vehicle.

Regardless of the method used, when a jarring event is determined, the calibration controller 110 then proceeds to determine if the vehicle and/or drone are in a level configuration. That is, the calibration controller 110 can determine an orientation of the drone 104 relative to an orientation of the vehicle 102. It will be understood that as designed, the AV platform 108 and the vehicle 102 are manufactured to be substantial alignment with one another. That is, a reference plane P1 for the AV platform 108 is substantially parallel with a reference plane P2 of the vehicle 102. The drone 104 can launch and land substantially normally to the reference plane P1 for the AV platform 108, allowing the drone 104 to operate in a level configuration relative to the AV platform 108.

Thus, when the drone 104 is correctly positioned on the AV platform 108, it is assumed that the drone 104 is level relative to the vehicle 102. In one use case, the calibration controller 110 can utilize images from the one or more cameras 116 to determine if the drone 104 is correctly positioned in/on the AV platform 108. For example, the calibration controller 110 might determine that the drone 104 is resting at an angle within the AV platform 108 due to the jarring event or misalignment during a prior landing procedure. Alternatively, the drone 104 might be resting on a foreign object that is within the AV platform 108, causing the drone 104 to be set at an angle relative to the AV platform 108. In yet another example, if the AV platform 108 includes a securement/alignment mechanism for the drone 104, the calibration controller 110 can determine when the securement mechanism has been engaged with the drone 104. It can be assumed that if the securement/alignment mechanism has been engaged, the drone 104 is positioned in a level configuration related to the AV platform 108.

Potential misalignment between the vehicle 102 and drone 104 could be determined using relative acceleration measurements obtained from both the vehicle 102 and the drone 104 over a period of time (such as while the vehicle 102 is in motion). That is, when the drone 104 is not substantially orthogonally oriented relative to the reference plane P1 of the AV platform 108, this discrepancy can be identified using the relative acceleration measurements. For example, a drone stationed in the rear of the vehicle may have toppled from its launch platform and may be unable to launch without manual intervention. The respective acceleration fields due to gravitational acceleration while the vehicle is stationary can reveal the respective misalignment between the drone and the vehicle. A vehicle's sensors, e.g. truck bed camera, may be used to confirm this state is correct or whether the drone accelerometer is defective.

The acceleration data can be obtained by the calibration controller 110 from the telematics control unit 112, or any other vehicle component that can determine acceleration data such as one or more accelerometers 113. Orientation information can be obtained from a gyroscope 115 that could be coupled to the telematics control unit 112. When the calibration controller 110 determines that the drone 104 is on a level surface (e.g., correctly positioned on the AV platform 108), the calibration controller 110 can transmit a signal to the drone controller 124 to begin a calibration routine. If the calibration controller 110 determines that the drone 104 is not on a level surface, the calibration controller 110 can forego transmitting the signal to the drone controller 124 to begin a calibration routine.

Figure 2:
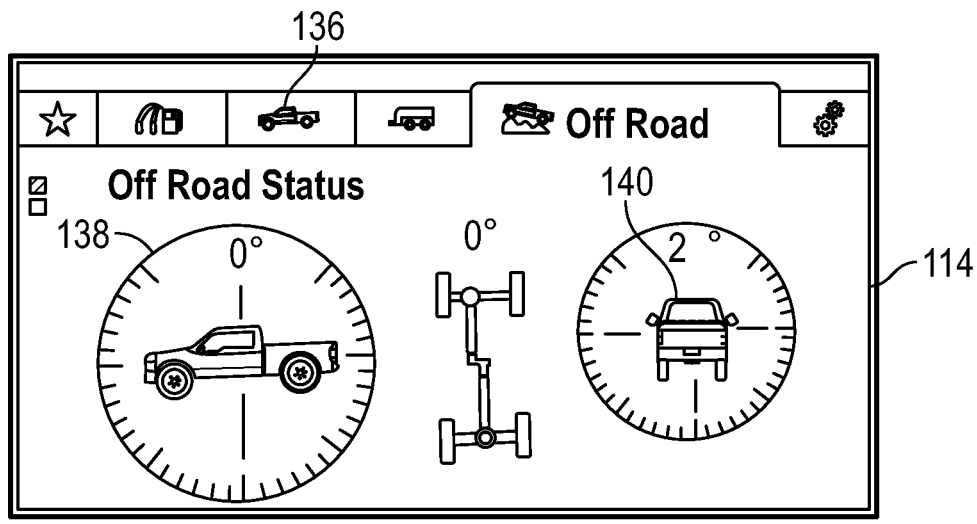
FIG. 2 illustrates a display of vehicle angle indicators.

During calibration, the calibration controller 110 can assess whether the vehicle 102 is level relative to the subordinate surface S. As illustrated in FIG. 2, a display 136 provided on the human-machine interface 114 can indicate if the vehicle 102 is angled front-to-back in indicator 138 or left-to-right in indicator 140. These data can be transmitted by the calibration controller 110 to the drone controller 124 for input into a calibration routine.

Referring back to FIG. 1, the calibration controller 110 can also transmit acceleration data to the drone controller 124 for input into a calibration routine. Again, these data can be obtained from the telematics control unit 112 of the vehicle 102 or directly from an accelerometer 115. The calibration controller 110 can apply a smoothing function to smooth the raw acceleration data and improve calibration routine accuracy. Examples of smoothing functions include, but are not limited to, Kalman filter, Particle filter, Fourier transform, a frequency analysis, or the like).

The calibration controller 110 can also be configured to determine navigation instructions that allow a driver of the vehicle (or autonomous driver logic) to drive the vehicle 102 to a level location when the calibration controller 110 determines that the vehicle 102 is on an uneven surface. This allows the vehicle 102 to be leveled prior to the calibration controller 110 transmitting a signal to the drone controller 124 to execute a calibration routine. The navigation instructions can be presented through the human-machine interface 114. For example, the human-machine interface 114 could display a message to the driver to relocate the vehicle to a flatter area. Detection of level ground may be determined based on vehicle sensors (e.g. cameras, lidar, etc.), computational methods (e.g. structure from motion, SLAM, etc.), and a global coordinate system generated from the vehicle's accelerometer data to orient the generated map to the Earth's acceleration frame of reference. In another example, the calibration controller 110 could use prior knowledge resources, such as topographical maps, satellite images, and geolocation maps to identify areas where roads or ground are likely to be flat. In other cases, the calibration controller 110 may take into account tree cover and the like to optimize the launch location to allow the optimal flight path that minimizes collision risks.

If leveling of the drone 104 relative to the AV platform 108 cannot be accomplished, and/or leveling of the vehicle 102 cannot be accomplished the calibration controller 110 can calculate an offset that is indicative of this leveling discrepancy. For example, if the vehicle 102 is parked on a downhill slope, the angle produced by this would be equivalent to the leveling discrepancy/offset. This leveling discrepancy/offset can be transmitted to the drone controller 124 as another input to the calibration routine. Thus, the drone controller 124 can take into account the leveling discrepancy/offset caused by vehicle angle when calibrating the gyroscope 126 and/or the accelerometer 128. For example, if the vehicle is angled front-to-back five degrees, this five degree offset is communicated to the drone controller 124 and applied as input during the calibration routine to adjust the calibration.

Figure 3:
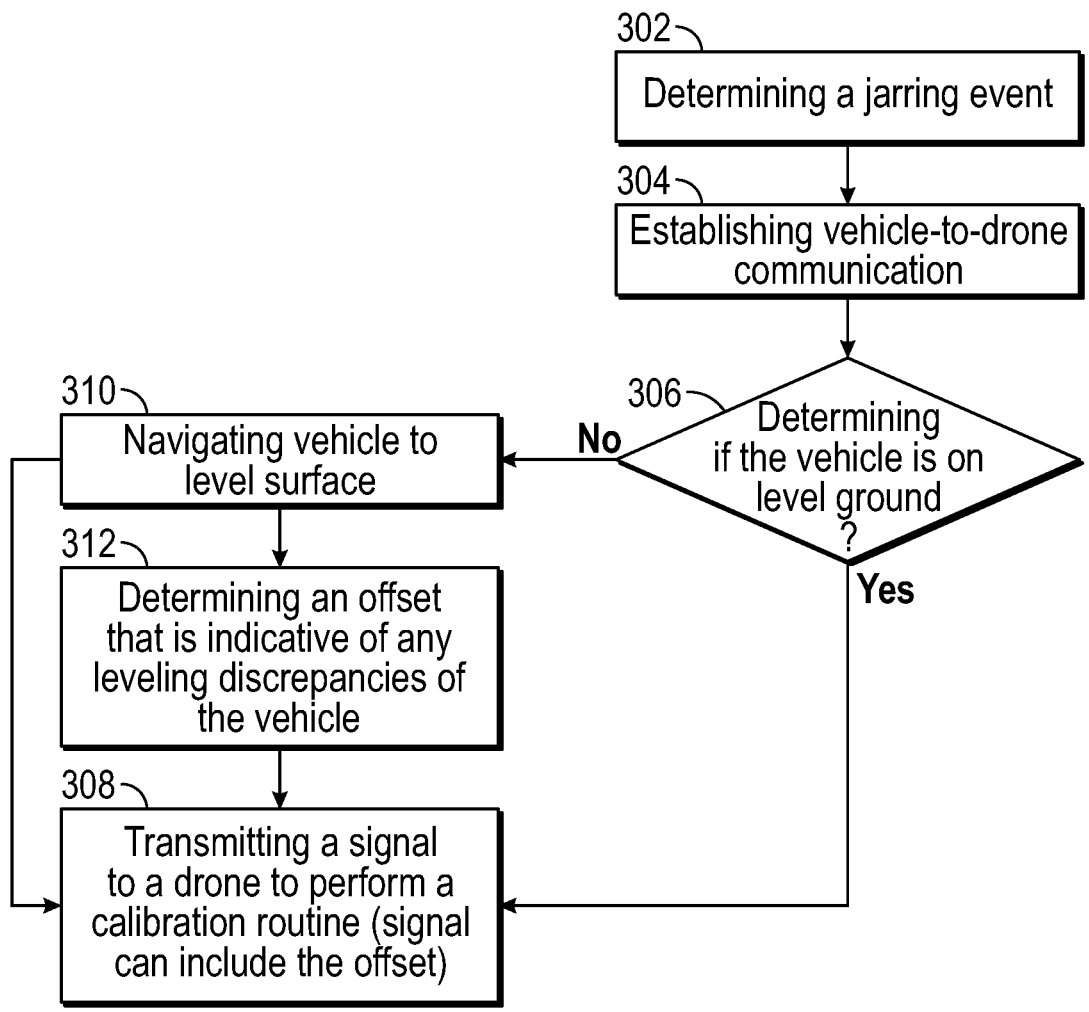
FIG. 3 is a flowchart of an example method of the present disclosure.

FIG. 3 is a flowchart of an example method of the present disclosure. The method includes a step 302 of determining a jarring event. Again, the jarring event can be determined using any desired criteria, such as a sudden change in acceleration in any direction of the vehicle 102. This could be calculated relative to g-force (gravitational force) that is experience by the vehicle. These data can be obtained from an accelerometer of the vehicle.

Next, the method can include a step 304 of establishing vehicle-to-drone communication. For example, the vehicle and drone could perform a handshake routine or other authorization/authentication process that allows the vehicle controller and the drone controller to communicate with one another. As noted above, the detection of the jarring event is not implemented in all instances. The calibration can be triggered by the calibration controller of the vehicle as desired, or when the vehicle cannot be placed into a level position relative to the ground/subordinate surface.

The method can include a step 306 of determining if the vehicle is on level ground. As noted above, this can be accomplished using onboard vehicle sensors that can determine if the vehicle is pitched in the forward-to-rearward plane or the right-to-left plane, or a combination of both of these planes. If the vehicle is level, the method can include a step 308 of transmitting a signal to a drone to perform a calibration routine. After receiving this signal, the drone controller can perform the calibration routine to calibrate a gyroscope and/or accelerometer of the drone.

If the vehicle is not level, the method can include a step 310 of navigating the vehicle to a level surface. This step could alternatively include transmitting a message to a driver of the vehicle to relocate the vehicle to find level ground. The user could be prompted to find a level surface when the calibration controller of the vehicle determines that the vehicle is not level with the ground or road. Again, this can be based on onboard vehicle sensors such as accelerometers, gyroscopes, and/or other components. If a level surface is found, the method can proceed to step 308 of transmitting a signal to a drone to perform a calibration routine.

When leveling of the vehicle cannot be achieved, the method can include a step 312 of determining an offset that is indicative of any leveling discrepancies of the vehicle. As noted above, this could include angles in the forward-to-rearward plane or the right-to-left plane of the vehicle relative to the ground. The offset is transmitted to the drone controller by the calibration controller of the vehicle. In step 308, the offset is used by the drone controller as an input to the calibration routine. As noted above, other data can also serve as input to the calibration routine such as real-time vehicle acceleration.

Figure 4:
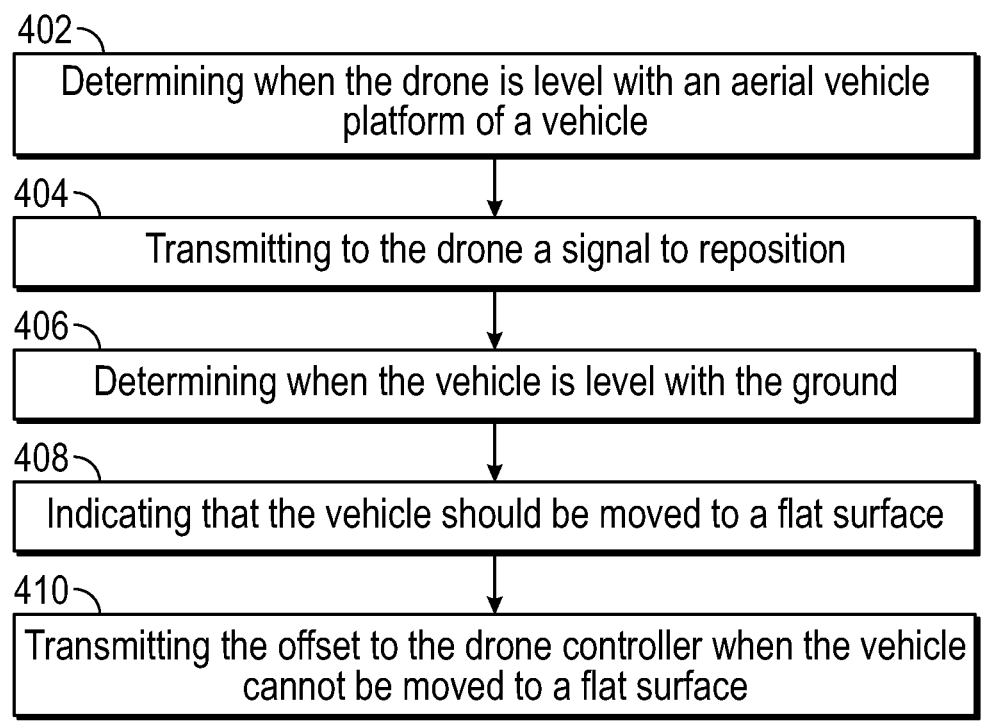
FIG. 4 is a flowchart of another example method of the present disclosure

FIG. 4 is another method of the present disclosure. The method includes a step 402 of determining when the drone is level with an aerial vehicle platform of a vehicle. If the drone is not level with an aerial vehicle platform of a vehicle, the method can include a step 404 of transmitting to the drone a signal to reposition. The drone can launch and land and attempt to position itself level to the aerial vehicle platform. In some instances, the method can terminate at step 402 until the drone is level with an aerial vehicle platform. This can include manual intervention by a user if needed to level the drone. As noted above, the determination of whether the drone is level or not can be made using images of the drone captured by a camera, or by detecting alignment or securement of the drone within the aerial vehicle platform, or through any other method disclosed herein.

Once the drone is determined to be level with the aerial vehicle platform, the method can include a step 404 of determining when the vehicle is level with the ground. If the vehicle is level, the method can include a step 406 of transmitting a signal to a drone controller to perform a calibration routine. If the vehicle is not level with the ground, the method can include a step 408 of indicating that the vehicle should be moved to a flat surface. If the vehicle cannot be leveled, the method can include a step of determining an offset that is indicative of any leveling discrepancies of the vehicle. The method can include a step 410 of transmitting the offset to the drone controller. The drone controller can feed the offset into the calibration routine and recalibrate the gyroscope and accelerometer of the drone.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
    determining a jarring event associated with a vehicle;
    determining that a drone is level relative to an aerial vehicle platform of the vehicle;
    determining that the vehicle is level relative to a subordinate surface;
    calibrating, based on the drone being level relative to the aerial vehicle platform of the vehicle and the vehicle being level relative to the subordinate surface, a gyroscope or an accelerometer of the drone;
    determining that the vehicle is not level relative to the subordinate surface;
    determining an offset that corresponds to an angle of the vehicle relative to the subordinate surface; and
    transmitting the offset to the drone for input into a calibration routine configured to calibrate the gyroscope or the accelerometer of the drone.

2. The method according to claim 1, wherein the angle can comprise to a front-to-back angle, a left-to-right angle, or both.

3. The method according to claim 1, further comprising:
determining that the drone is not level relative to the aerial vehicle platform of the vehicle;
transmitting a signal to the drone to reposition; and
determining that the drone is level relative to the aerial vehicle platform after the drone is repositioned.

4. The method according to claim 1, further comprising:
determining vehicle acceleration data; and
transmitting the vehicle acceleration data to the drone for input into a calibration routine configured to calibrate the gyroscope or the accelerometer of the drone.

5. The method according to claim 4, further comprising applying a smoothing function configured to smooth the acceleration data and improve the calibration of the gyroscope or the accelerometer of the drone.

6. The method according to claim 1, further comprising:
determining that the vehicle is not level relative to the subordinate surface; and
transmitting an indication to a driver to relocate the vehicle to a location where the vehicle is level with the subordinate surface.

7. The method according to claim 1, wherein determining the jarring event includes detecting a threshold exceeding change to an acceleration of the vehicle.

8. A method, comprising:
establishing vehicle-to-drone communication between a calibration controller of a vehicle and a drone controller of a drone;
determining when the vehicle is on level ground, wherein when the vehicle is not on level ground a message is transmitted to a driver of the vehicle to relocate the vehicle;
determining an offset when the vehicle cannot be leveled; and
transmitting a signal from the calibration controller to the drone controller to calibrate a component of the drone, the drone controller using the offset as an input to a calibration routine.

9. The method according to claim 8, further comprising executing the calibration routine with the offset used as an input.

10. The method according to claim 8, further comprising determining vehicle acceleration data, the vehicle acceleration data being used as an additional input to the calibration routine.

11. The method according to claim 10, further comprising determining a jarring event, wherein the jarring event includes a threshold exceeding change in the vehicle acceleration data of the vehicle.

12. The method according to claim 8, wherein the offset that corresponds to an angle of the vehicle.

13. The method according to claim 12, wherein the angle can comprise to a front-to-back angle, a left-to-right angle, or both.

14. The method according to claim 8, further comprising:
determining that the drone is not level relative to an aerial vehicle platform of the vehicle;
transmitting a signal to the drone controller by the calibration controller to reposition; and
determining that the drone is level relative to the aerial vehicle platform after the drone is repositioned.

15. A system, comprising:
a processor; and
a memory for storing instructions, the processor executing the instructions to:
determine a jarring event;
determine when a drone is level relative to an aerial vehicle platform of a vehicle, the vehicle comprising a calibration controller;
determine when the vehicle is level relative to a subordinate surface; and
transmit a signal to a drone controller by the calibration controller to calibrate a gyroscope or an accelerometer of the drone;
transmit a signal to the drone controller by the calibration controller to reposition; and
determine that the drone is level relative to the aerial vehicle platform after the drone is repositioned.

16. The system according to claim 15, wherein the processor is configured to determine an offset that corresponds to an angle of the vehicle relative to the subordinate surface; and transmit offset to the drone controller for input into a calibration routine used to calibrate the gyroscope or the accelerometer of the drone.

17. The system according to claim 15, wherein the processor is configured to:
determine vehicle acceleration data; and
transmit the vehicle acceleration data to the drone controller for input into a calibration routine used to calibrate the gyroscope or the accelerometer of the drone.

18. The system according to claim 17, wherein the processor is configured apply a smoothing function to smooth the acceleration data and improve the calibration of the gyroscope or the accelerometer of the drone.

19. A method, comprising:
determining a jarring event associated with a vehicle;
determining that a drone is level relative to an aerial vehicle platform of the vehicle;
determining that the vehicle is level relative to a subordinate surface;
calibrating, based on the drone being level relative to the aerial vehicle platform of the vehicle and the vehicle being level relative to the subordinate surface, a gyroscope or an accelerometer of the drone;
determining that the drone is not level relative to the aerial vehicle platform of the vehicle;
transmitting a signal to the drone to reposition; and
determining that the drone is level relative to the aerial vehicle platform after the drone is repositioned.

20. A method, comprising:
determining a jarring event associated with a vehicle;
determining that a drone is level relative to an aerial vehicle platform of the vehicle;
determining that the vehicle is level relative to a subordinate surface;
calibrating, based on the drone being level relative to the aerial vehicle platform of the vehicle and the vehicle being level relative to the subordinate surface, a gyroscope or an accelerometer of the drone;
determining that the vehicle is not level relative to the subordinate surface; and
transmitting an indication to a driver to relocate the vehicle to a location where the vehicle is level with the subordinate surface.

* * * * *